(12) United States Patent
Arns

(10) Patent No.: US 7,543,866 B2
(45) Date of Patent: Jun. 9, 2009

(54) BUMPER STRUCTURE

(75) Inventor: Wilhelm Arns, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 69 days.

(21) Appl. No.: 11/689,106

(22) Filed: Mar. 21, 2007

(65) Prior Publication Data

US 2007/0267877 A1    Nov. 22, 2007

(30) Foreign Application Priority Data

Mar. 21, 2006    (DE) .................. 10 2006 013 273

(51) Int. Cl.
*B60R 19/24* (2006.01)
(52) U.S. Cl. ...................................... 293/133
(58) Field of Classification Search ............... 293/102, 293/120, 132, 133, 154, 155
See application file for complete search history.

(56) References Cited

U.S. PATENT DOCUMENTS

| 3,697,108 | A | * | 10/1972 | Diener ................ | 293/133 |
| 3,747,969 | A | * | 7/1973 | Diener ................ | 293/133 |
| 4,597,603 | A | * | 7/1986 | Trabert ............... | 296/193.1 |
| 4,823,923 | A | * | 4/1989 | Moyer ................ | 188/376 |
| 4,889,374 | A | * | 12/1989 | Choun ................ | 293/132 |
| 4,929,008 | A | * | 5/1990 | Esfandiary .......... | 293/108 |
| 6,299,227 | B1 | * | 10/2001 | Kroning et al. ...... | 293/132 |
| 6,371,541 | B1 | * | 4/2002 | Pedersen ............. | 293/132 |
| 6,918,621 | B2 | * | 7/2005 | Seksaria ............. | 293/133 |

FOREIGN PATENT DOCUMENTS

| DE | 2 162 412 A | 6/1973 |
| DE | 196 06 538 A1 | 8/1997 |
| DE | 199 07 783 A1 | 8/2000 |
| DE | 102 34 045 A1 | 2/2004 |
| EP | 497636 A1 * | 8/1992 |
| EP | 1 234 729 A1 | 8/2002 |
| EP | 1 604 869 A1 | 12/2005 |
| FR | 2 506 700 | 12/1981 |
| JP | 08 216 808 A | 8/1996 |
| WO | WO 2004/113131 | 12/2004 |

* cited by examiner

*Primary Examiner*—H Gutman
(74) *Attorney, Agent, or Firm*—Henry M. Feiereisen; Ursula B. Day

(57) ABSTRACT

A bumper structure for the front and rear area of a motor vehicle includes a bumper cross member, and a crash box placed between the cross member and an end of a side rail. At least two bolted connections, extending in upright direction of the motor vehicle and disposed in parallel relationship, are provided for detachably securing the cross member to the crash box, wherein one of the bolted connections extends through a bore to define a pivot axis of the cross member whereas the other one of the bolted connections is arranged in an oblong hole to allow a limited rotation of the cross member about the pivot axis. In this way, damage to the crash box that is distal to the impact site is prevented.

14 Claims, 3 Drawing Sheets

BUMPER STRUCTURE

CROSS-REFERENCES TO RELATED APPLICATIONS

This application claims the priority of German Patent Application, Serial No. 10 2006 013 273.4, filed Mar. 21, 2006, pursuant to 35 U.S.C. 119(a)-(d), the content of which is incorporated herein by reference in its entirety as if fully set forth herein.

BACKGROUND OF THE INVENTION

The present invention relates, in general, to a bumper structure for a motor vehicle.

Nothing in the following discussion of the state of the art is to be construed as an admission of prior art.

A bumper structure is mounted to the front or rear of a motor vehicle and includes a bumper cross member to transmit impact forces, generated in the event of a collision, into crash boxes which are arranged at the ends of side rails of the motor vehicle. In this way, impact energy is converted locally in the crash boxes into deformation energy. In current crash repair tests, a vehicle is moved against a barrier with slight overlap at low speed. As a consequence of the relatively slight overlap, it is desired to keep away any damage from the side of the motor vehicle that has not hit the obstacle in order to avoid repair work and for insurance reasons. The same holds true for the impact-distal crash box on the unaffected side.

Crash boxes may be connected in one spot or several spots to the cross member. A multi-point attachment is disclosed, e.g., in European Pat. Publ. No. EP 1 234 729 and International Publ. No. WO 2004/113131. Examples of a single-point attachment include German Offenlegungsschrift DE 102 34 045 A1 and German Offenlegungsschrift DE 199 07 783 A1. Single-point attachments with oblong holes are disclosed in European Pat. Publ. No. EP 1 604 869 A1 or French Pat. No. FR 2 506 700. Japanese Pat. No. JP 08 216 808 A discloses the provision of guide elements in an area of attachment of the bumper cross member. German Offenlegungsschrift DE 2 162 412 A discloses a movable support of the bumper cross member in relation to the vehicle body via pivot arms.

However, for a number of reasons, the various proposals are endowed with drawbacks and shortcomings because the attachment area of the crash box that is not part in an actual collision becomes destroyed and thus must be replaced.

It would therefore be desirable and advantageous to provide an improved bumper structure to obviate prior art shortcomings and to prevent damage to a crash box that is distal to the crash site.

SUMMARY OF THE INVENTION

According to one aspect of the present invention, a bumper structure for the front and rear area of a motor vehicle includes a bumper cross member, a crash box placed between the cross member and an end of a side rail, and at least two bolted connections, extending in upright direction of the motor vehicle and disposed in parallel relationship, for detachably securing the cross member to the crash box, wherein one of the bolted connections extends through a bore to define a pivot axis of the cross member whereas the other one of the bolted connections is arranged in an oblong hole to allow limited rotation of the cross member about the pivot axis.

The present invention resolves prior art problems by swingably supporting the bumper cross member in relation to the crash boxes despite the provision of two bolted connections in parallel relationship. The provision of the oblong hole allows a pivoting of the cross member to a certain degree in the event of an impact, without damage to the crash box that is distal to the impact area. A maximum pivot angle is reached, when the crash box at the site of impact is completely crumpled or upset. Only further damage beyond a complete crumpling of the crash box in the area of the impact would lead to damage of the crash-site distal crash box.

A bumper structure according to the invention proves its effectiveness in particular, when so-called low-speed crash tests are involved which represents a frequent crash type with characteristic damage picture that put great strain on insurances. At these typical crashes, the bumper structure according to the invention is most beneficial not only because of the reduced repair costs but also because a driver may be classified in a lower insurance class. Even at crashes at higher speeds and impact in the center of the vehicle, the bumper structure according to the invention proves beneficial because the provision of the oblong hole provides an initially higher resiliency that does not adversely affect the entire bumper structure while at the same time does not structurally weaken the overall bumper structure.

It has also been shown that the required structural integrity and stiffness is maintained, despite the provision of an oblong hole, in order to realize an effective vibration behavior according to NVH tests (noise, vibration, and harshness), used for designing a motor vehicle.

According to another feature of the present invention, the one of the bolted connections may be disposed proximal to a longitudinal center plane of the motor vehicle and the other one of the bolted connections may be disposed distal to the longitudinal center plane of the motor vehicle. In other words, the bolted connection that is closer to the center axis, i.e. more inwards, defines the pivot axis. Thus, the outer bolted connection extends through the oblong hole. Of course, the reverse configuration may be conceivable as well. In this case, the oblong hole of the inner bolted connection has to be positioned slightly forwards, as viewed in travel direction of the vehicle, instead of rearwards as in the other configuration. As a result, in the event of a frontal impact with 100% overlap, the inner bolted connection does, however, not initially contribute to a force transmission from the cross member to the crash box. In other words, the cross member transmits all forces into the outer bolted connection or deforms in the course of the crash until the other bolted connection also transmits forces into the crash box. Therefore, the provision of the inner bolted connection as pivot axis is currently preferred.

According to another feature of the present invention, the cross member may also be connected to the crash box by more than two bolted connections, e.g. three bolted connections which extend in parallel relationship, thereby defining a central bolted connection which forms the pivot axis, while the two other bolted connections engage in oblong holes which point in opposite directions.

According to another feature of the present invention, the oblong hole is sized sufficiently long so that an upsetting of the crash box is prevented from interfering with a displacement of another one of such a crash box arranged at an end of another side rail so that damage to this other crash box is prevented. In other words, the other (crash-site distal) crash box is not subjected to a plastic deformation at the oblong hole thereof. It is hereby secondary, whether the oblong hole is arranged in the crash box or in the cross member.

According to another feature of the present invention, the other one of the bolted connection may be disposed at an outer end of the oblong hole when the cross member is in the desired position. As a result, the entire impact force can be introduced from the cross member into the crash box, when the cross member is connected to a crash-site proximal crash box via two parallel bolted connections, without necessitating a displacement of the cross member in relation to the bolted connection.

According to another feature of the present invention, each of the bolted connections may include a single bolt, with the bolt of the one bolted connection being sized long enough to extend through opposite bores, and the bolt of the other bolted connection being sized long enough to extend through opposite oblong holes. As an alternative, the bolted connections may also be implemented by two short bolts.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
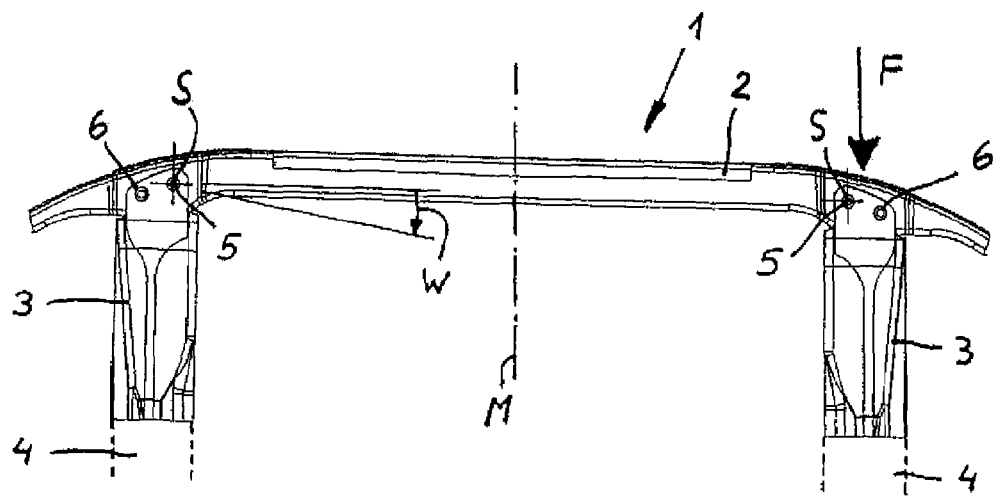
FIG. 1 is a top plan view of a bumper structure according to the present invention for a front or rear area of a motor vehicle.

Throughout all the Figures, same or corresponding elements are generally indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

This is one of two applications both filed on the same day. Both applications deal with related inventions. They are commonly owned and have the same inventive entity. Both applications are unique, but incorporate the other by reference. Accordingly, the following U.S. patent application, entitled "Bumper Structure", is hereby expressly incorporated by reference:

Turning now to the drawing, and in particular to FIG. 1, there is shown a top plan view of a bumper structure according to the present invention, generally designated by reference numeral 1 and placed across a front or rear of an unillustrated motor vehicle. The bumper structure 1 includes a bumper cross member 2 which is mounted to spaced-apart crash boxes 3, respectively disposed at the ends of side rails 4 of the motor vehicle. The side rails 4 are not shown in greater detail for sake of simplicity.

Figure 2:
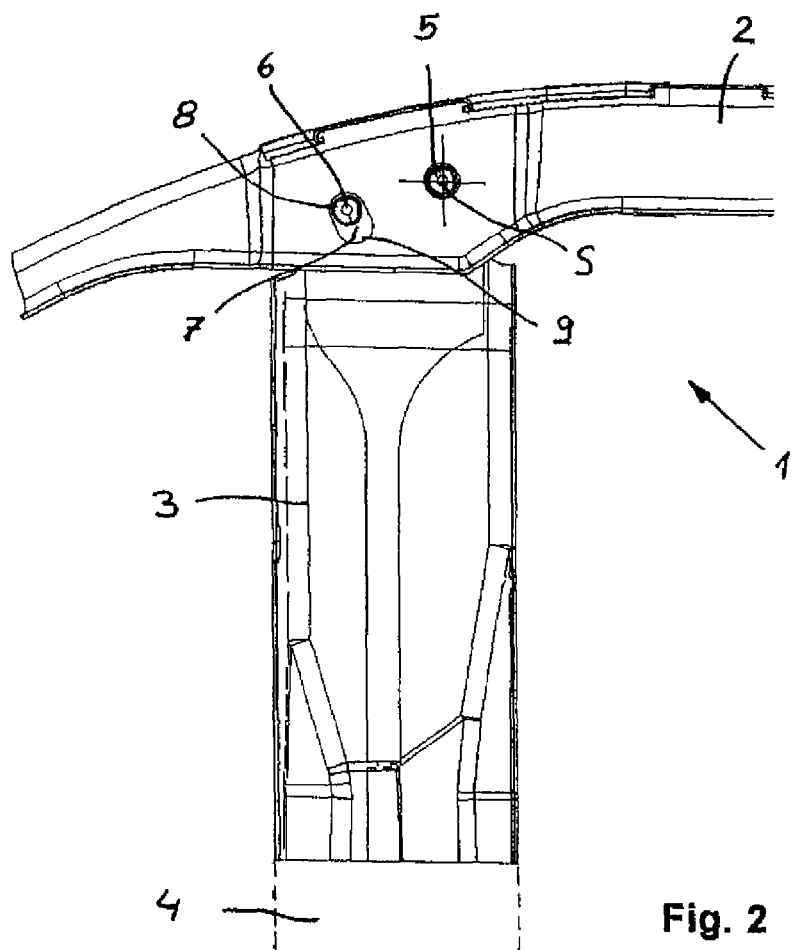
FIG. 2 is a detailed sectional top plan view, on an enlarged scale, of a crash box located on the left-hand side of the bumper structure of FIG. 1.

As shown in FIGS. 1 and 2, the cross member 2 is connected at attachment zones to each of the crash boxes 3 by means of bolted connections 5, 6. The upright direction of the vehicle corresponds in this case to the vertical with respect to the drawing plane of FIG. 1. The bolted connections 5, 6 are arranged side-by-side to one another transversely to a travel direction of the vehicle. With respect to a longitudinal center axis M of the vehicle, the proximal (inner) bolted connection 5 is positioned slightly forward in relation to the distal (outer) bolted connection 6 as viewed in the travel direction of the vehicle.

The inner bolted connection 5 defines a pivot axis S of the cross member 2. It will be understood by persons skilled in the art that the cross member 2 is, of course, securely fastened to the crash boxes 3 so that impact forces, as indicated by way of example by arrow F on the right-hand side of FIG. 1, can be transmitted into the respective crash box 3. While the other crash box 3 on the left-hand side would remain unaffected and thus undamaged, when the force F impacts as shown, the upending of the crash box 3 on the right-hand side would cause a displacement of the cross member 2 about a pivot angle W, so that the bolted connection 5 on the left-hand crash box 3 is exposed to a force which is directed in the direction of this crash box. The outer bolted connection 6, on the other hand, transmits a force onto the crash box 3 which points in travel direction. This would cause damage to the crash box 3 in the event of a firmly bolted cross member 3.

This problem has now been overcome by the bumper structure 1 according to the invention by placing the outer bolted connection 6 in a suitably dimensioned oblong hole 7 of the crash box 3. As shown in FIG. 2, the oblong hole 7 extends in opposition to the travel direction slantingly rearwards, i.e. in the direction toward the side rail 4. As a result, the cross member 2 is able to rotate about the pivot angle W, shown in FIG. 1. The bolted connection 6 changes hereby its relative position to the oblong hole 7. In other words, when rotated, the bolted connection 6 is no longer positioned upon the forward outer end 5 in the oblong hole 7 but rather upon the rear outer end 9. Of course, it is not the bolted connection 6 that is moved but only the oblong hole 7 formed in the cross member 2. As an alternative, a reverse configuration may be conceivable as well, as shown in FIG. 3, in which the bolted connection 5 is placed in a suitably dimensioned oblong hole 7.

Figure 4:
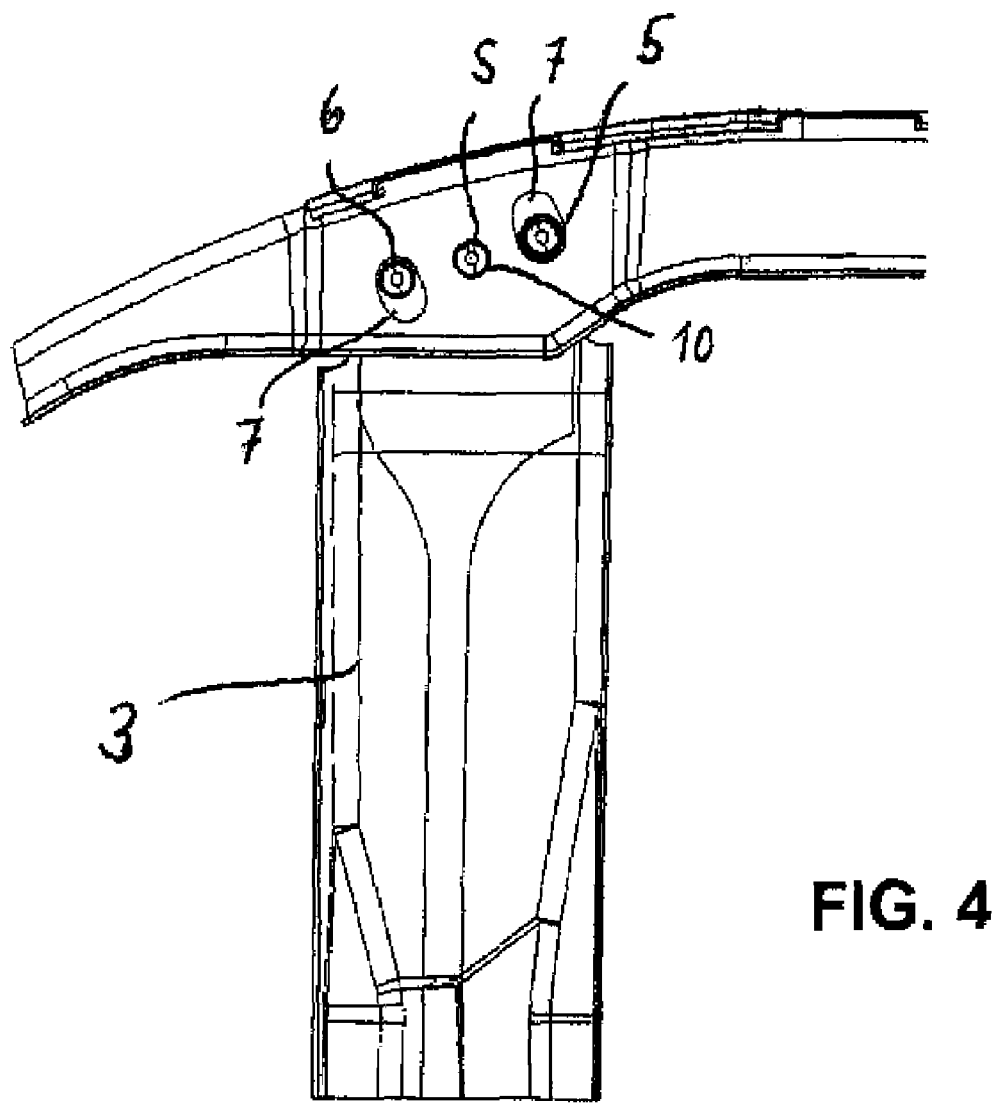
FIG. 4 is a detailed sectional top plan view, on an enlarged scale, of yet another variation of a crash box of the bumper structure.

FIG. 4 shows a detailed sectional top plan view, on an enlarged scale, of yet another variation of a crash box 3, whereby the cross member 3 is connected to the crash box 3 by three bolted connections 5, 6, 10 which extend in parallel relationship, thereby defining a central bolted connection 10 which forms the pivot axis S, while the two other bolted connections 5, 6 engage in oblong holes 7 which point in opposite directions.

Figure 3:
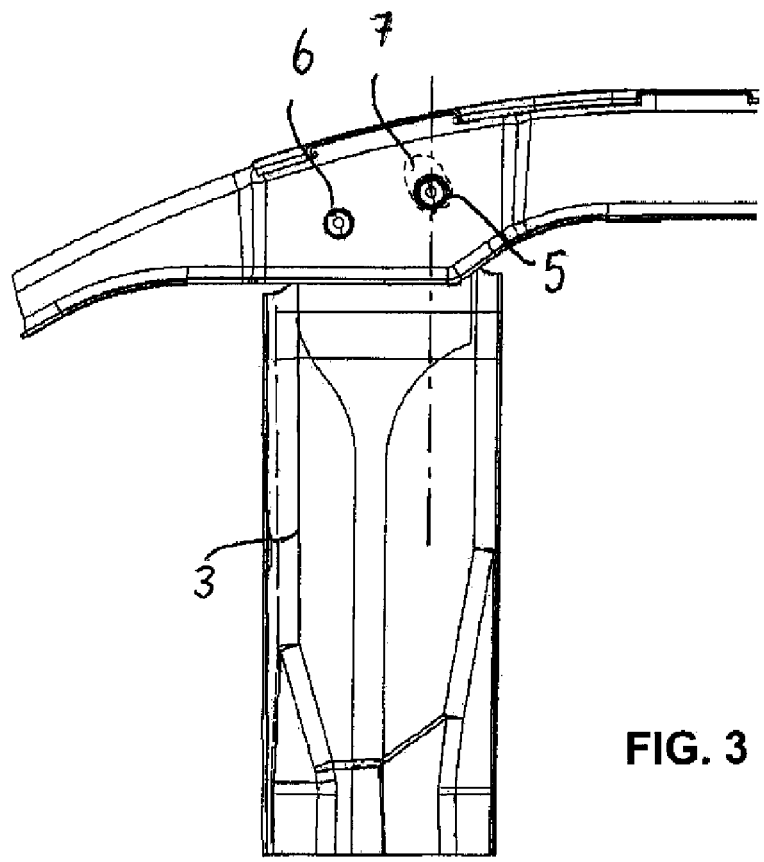
FIG. 3 is a detailed sectional top plan view, on an enlarged scale, of a variation of a crash box of the bumper structure.
Figure 5:
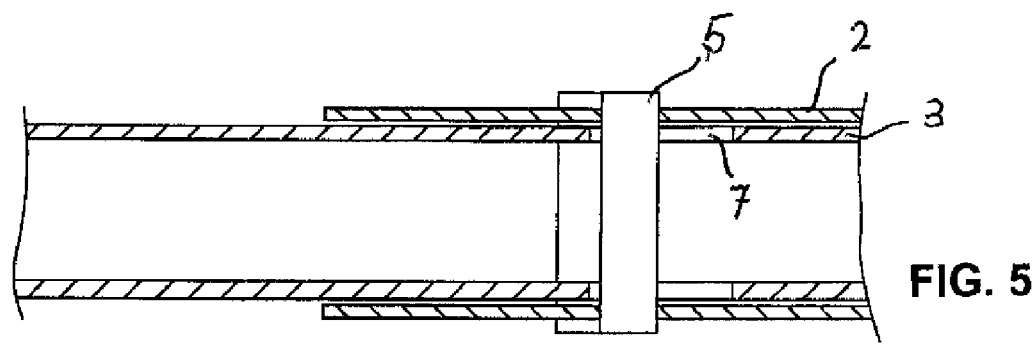
FIG. 5 is a sectional view taken along the section line indicated in FIG. 3.

FIG. 5 is a sectional view taken alone the section line indicated in FIG. 3 and shows the provision of a single bolt 5 sized long enough to extend through opposite oblong holes 7.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A bumper structure for the front and rear area of a motor vehicle, comprising:
 a bumper cross member;
 a crash box placed between the cross member and an end of a side rail; and
 at least two bolted connections, extending in upright direction of the motor vehicle and disposed in parallel relationship, for detachably securing the cross member to the crash box, wherein one of the bolted connections extends through a bore to define a pivot axis of the cross member whereas the other one of the bolted connections is arranged in an oblong hole to allow a limited rotation of the cross member about the pivot axis.

2. The bumper structure of claim 1, wherein the one bolted connection is disposed proximal to a longitudinal center plane of the motor vehicle and the other bolted connection is disposed dial to the longitudinal center plane of the motor vehicle.

3. The bumps structure of claim 2, wherein the oblong hole for the other bolted connection is disposed behind the bore for the one bolted connection.

4. The bumps structure of claim 3, wherein the oblong hole for the other bolted connection extends slantingly rearwards in a direction of the side rail.

5. The bumps structure of claim 1, wherein the one bolted connection is disposed dial to a longitudinal center plane of the motor vehicle and the other the bolted connection is disposed proximal to the longitudinal center plane of the motor vehicle.

6. The bumper structure of claim 5, wherein the oblong hole for the other bolted connection is disposed forwards of the bore for the one bolted connection.

7. The bumper structure of claim 1, wherein the cross member is connected to the crash box by three bolted connections extending in parallel relationship, thereby defining a central bolted connection, said central bolted connection defining the pivot axis.

8. The bumper structure of claim 7, wherein the two other bolted connections are received in oblong holes which point in opposite directions.

9. The bumper structure of claim 1, wherein the oblong hole is sized sufficiently long so that an upsetting of the crash box is prevented from interfering with a displacement of another one of said crash box arranged at an end of another side rail in the absence of a destruction of the other crash box.

10. The bumper structure of claim 1, wherein the oblong hole is arranged in the crash box.

11. The bumper structure of claim 1, wherein the oblong hole is arranged in the cross member.

12. The bumper structure of claim 1, wherein the other bolted connection is disposed at an outer end of the oblong hole in a desired position of the cross member.

13. The bumper structure of claim 1, wherein each of the bolted connections includes a single bolt, with the bolt of the one bolted connection being sized long enough to extend through opposite bores, and the bolt of the other bolted connection being sized long enough to extend through opposite oblong holes.

14. The bumper structure of claim 1, wherein the one bolted connection includes two short bolts disposed in alignment and extending through opposite bores, and the other bolted connection includes two short bolts disposed in alignment and extending through opposite oblong holes.

* * * * *

UNITED STATES PATENT AND TRADEMARK OFFICE
CERTIFICATE OF CORRECTION

PATENT NO. : 7,543,866 B2
APPLICATION NO. : 11/689106
DATED : June 9, 2009
INVENTOR(S) : Wilhelm Arns It is certified that error appears in the above-identified patent and that said Letters Patent is hereby corrected as shown below:

Column 5, Claim 2, line 23: replace "dial" with --distal--;

Column 5, Claim 3, line 25: replace "bumps" with --bumper--;

Column 5, Claim 4, line 28: replace "bumps" with --bumper--;

Column 5, Claim 5, line 31: replace "bumps" with --bumper--;

line 32: replace "dial" with --distal--;

Signed and Sealed this

Twenty-fifth Day of August, 2009

David J. Kappos
*Director of the United States Patent and Trademark Office*